Patented July 6, 1954

2,683,140

UNITED STATES PATENT OFFICE 2,683,140

POLYMERIZATION OF ETHYLENICALLY UNSATURATED COMPOUNDS WITH VANADOUS CATALYST

Edward G. Howard, Jr., Wilmington, Del., assignor to E. I. du Pont de Nemours and Company, Wilmington, Del., a corporation of Delaware No Drawing. Application December 19, 1950, Serial No. 201,705

11 Claims. (Cl. 260—88.7)

This invention relates to the addition polymerization of polymerizable organic compounds and more particularly to new polymerization catalyst systems.

Polymerization of ethylenically unsaturated compounds is a process of great technical importance. Generally employed as polymerization catalysts are compounds containing directly linked oxygen or nitrogen atoms such as benzoyl peroxide, potassium persulfate or alpha,alpha'-azodiisobutyronitrile. In conventional polymerization systems, relatively high temperatures are required to obtain high rates of conversion of the monomeric unsaturate to a polymer. The use of elevated temperatures often leads to products of inferior qualities. In some instances where appreciable rates of polymerization have been achieved at lower temperatures, the products obtained have superior physical properties which are of substantial economic importance, such as, for example, the increased abrasion resistance of synthetic rubbers prepared at temperatures which are low.

This invention has as an object a new polymerization process. A further object is the provision of new initiator compositions. Other objects will appear hereinafter.

These objects are accomplished by the process of this invention wherein an ethenoid monomer, i. e., an ethylenically unsaturated monomer, subject to addition polymerization by reason of a nonaromatic carbon to carbon double bond is polymerized at low temperatures and at a rapid rate by bringing the monomer in contact in an aqueous system with an initiator system of the present invention, i. e., vanadous ion and at least one of the following mild oxidizing agents: hydroxylamine, preferably in the form of a salt, organic or inorganic, thereof; hydroxylamino compounds of the formula,

wherein R and R' are monovalent radicals, including hydrogen, but otherwise preferably organic and preferably hydrocarbon, or R and R' together form a divalent organic radical, preferably hydrocarbon, and X is hydrogen or an inorganic salt forming group, including hydroxyl- aminesulfonate ions, hydroxamic acids, and oximes; and lower, i. e., one to four carbon, aliphatic nitro compounds.

The following examples in which parts are by weight are illustrative of the invention. In the examples the vanadous ion employed was obtained by the reduction of a vanadyl sulfate solution in a Jones Reductor. The customary technique was to reduce 0.5 part of vanadyl sulfate dihydrate to hypovanadous sulfate in an acidified solution. The resulting aqueous solution of vanadous ion, unless otherwise specified, consisted of 30 parts and contained 0.5 mol per cent of sulfuric acid.

Example I

A glass vessel was charged with 13.2 parts of acrylonitrile, 30 parts of water, 56 parts of ethyl alcohol, 0.17 part of hydroxylamine hydrochloride and 30 parts of the vanadous sulfate solution. After one and a half hours at —25° C., 5.2 parts of polymer corresponding to a 39% yield was obtained.

Example II

The following materials were placed in a glass container: 13.2 parts of acrylonitrile, 200 parts of water, 0.19 part of hydroxylamine hydrochloride, and 30 parts of the vanadous sulfate solution. After 40 minutes at 0° C. a 25% yield of polymer was obtained.

Example III

A glass vessel was charged with 13.2 parts of acrylonitrile, 218 parts of water, 1.5 parts of a solution containing 0.018 part of vanadous sulfate and 0.0087 part of hydroxylamine hydrochloride. After two hours at 25° C., 7.6 parts of polymer was obtained corresponding to a 58% yield.

Example IV

When the general procedure of Example III was repeated except one half of the quantities of vanadous sulfate and hydroxylamine hydrochloride were employed, a 21% yield of polymer was obtained.

Example V

When the general procedure of Example II was repeated except that 0.43 part of benzenesulfohydroxamic acid was used in place of the hydroxylamine hydrochloride, there resulted a 43% conversion of monomer to polymer.

*Example VI*

A glass vessel was charged with 13.2 parts of acrylonitrile, 190 parts of water, 0.33 part of hydroxylammonium sebacate and 30 parts of the vanadous sulfate solution. Within two hours at 25° C., a 28% yield of polymer resulted.

*Example VII*

The following materials were charged in a glass container: 13.2 parts of acrylonitrile, 25 parts of water, 48 parts of ethyl alcohol, 0.45 part of potassium hydroxylaminedisulfonate, 30 parts of the vanadous sulfate solution and 5 parts of 0.5 N hydrochloric acid. A 33% conversion of monomer to polymer was obtained in one-half hour at 0° C.

*Example VIII*

A glass vessel was charged with 13.2 parts of acrylonitrile, 190 parts of water, 0.09 part of acetone oxime, 30 parts of the vanadous sulfate solution and 5 parts of 0.5 N hydrochloric acid. A 59% yield of polymer was obtained at 10–25° C. in one and one-fourth hours.

*Example IX*

A container was charged with 13.2 parts of acrylonitrile, 190 parts of water, 0.18 part of propionaloxime, 30 parts of the vanadous sulfate solution and 10 parts of 0.25 N sulfuric acid. In one and a half hours at 15–25° C., a 38% conversion to polyacrylonitrile resulted.

*Example X*

When the general procedure of Example IX was repeated except that 0.25 part of the monoxime of dimethylglyoxal was employed as the oxime, a 55% yield of polymer was obtained in one-half hour at 30° C.

*Example XI*

A glass vessel was charged with 13.2 parts of acrylonitrile, 40 parts of ethyl alcohol, 10 parts of water, 0.15 part of dimethyl glyoxime, 30 parts of the vanadous sulfate solution and 10 parts of 0.25 N sulfuric acid. A 36% conversion to polymer resulted in six hours at 25° C.

*Example XII*

When the general procedure of Example IX was repeated except that 0.30 part of cyclohexanone oxime was employed as the oxime, a 61% yield of polymer was obtained.

*Example XIII*

When the general procedure of Example VI was repeated except that 10 parts of 0.25 N sulfuric acid was added the conversion to polymer, in one hour at 0° C., amounted to 73%.

*Example XIV*

When the general procedure of Example VIII was repeated except that 0.22 part of 2-nitropropane was employed in the place of the oxime, and 10 parts of 0.25 N sulfuric acid was used in place of the hydrochloric acid, a 61% yield of polymer was obtained at 0° C. in one and one-fourth hours.

*Example XV*

When the general procedure of Example XIV was repeated except that 0.037 part of vanadous sulfate and 0.0056 part of 2-nitropropane was present, a 64% yield of polymer was obtained in four hours. Further reduction in the amounts of nitropropane and vanadous ion to one-fifth of the above amounts reduced the yield only to 30%.

*Example XVI*

A pressure-resistant glass vessel was charged with 15.6 parts of vinyl chloride, 56 parts of ethyl alcohol, 20 parts of water, 0.17 part of hydroxylamine hydrochloride, and 30 parts of the vanadous sulfate solution. In 30 minutes at 0° C. a 24% yield of polymer was obtained.

*Example XVII*

When the general procedure of Example XVI was repeated except that 0.43 part of benzenesulfohydroxamic acid was employed in place of the hydroxylamine hydrochloride after one hour at 0° C. the yield of polyvinyl chloride was 81%.

*Example XVIII*

When the general procedure of Example XVI was repeated except that 0.12 part of 2-nitropropane was substituted for the hydroxylamine hydrochloride and 10 parts of 0.25 N sulfuric acid was substituted for 10 parts of water, a 22% yield of polymer was obtained in one and a half hours.

*Example XIX*

A glass container was charged with 12.5 parts of methyl methacrylate, 40 parts of ethyl alcohol, 20 parts of water, 0.21 part of benzenesulfohydroxamic acid and 30 parts of the vanadous sulfate solution. In two hours at 0° C. a 63% yield of polymer was obtained.

The process of this invention is of generic application to the addition polymerization of polymerizable compounds having the nonaromatic, or ethylenic >C=C< group. It is particularly applicable to monomeric unsaturated polymerizable compounds in which the unsaturation is due to a terminal ethylenic group which is attached to a negative radical. It is thus applicable to polymerizable vinylidene compounds, including vinyl compounds and particularly preferred are those which contain the $CH_2=C<$ group.

Compounds having a terminal methylene which are subject to polymerization and copolymerization with the initiators of this invention include olefins, e. g., ethylene, isobutylene; acrylyl and alkacrylyl compounds, e. g., acrylonitrile, methyl acrylate, ethyl methacrylate, methacrylic acid, methacrylamide; vinyl and vinylidene halides, e. g., vinyl chloride, vinylidene chloride; vinyl carboxylates, e. g., vinyl acetate, vinyl trimethylacetate; vinyl imides, e. g., N-vinylphthalimide; N-vinyllactams, e. g., N-vinylcaprolactam; vinyl aryls such as styrene and other vinyl derivatives such as the vinylpyridines, methyl vinyl ketone and vinyl ethyl ether.

Fluoroethylenes, including vinyl fluoride, tetrafluoroethylene, chlorotrifluoroethylene and 1,1-dichloro-2,2-difluoroethylene may be polymerized and copolymerized by the process of this invention.

Polymerizable compounds that have a plurality of ethylenic double bonds that similarly may be polymerized or copolymerized include those having conjugated double bonds, such as butadiene and 2-chlorobutadiene, and compounds which contain two or more double bonds which are isolated with respect to each other, such as ethylene glycol dimethacrylate, methacrylic anhydride, diallyl maleate and divinyl benzene.

In addition to copolymers obtainable from the classes of monomers mentioned above, the copolymerization of fumaric or maleic esters with types of monomers mentioned, may be effected by the process of this invention. Furthermore, the term "polymerization" includes within its scope (in addition to the polymerization of a monomer alone or of two or more monomers, i. e., copolymerization) the polymerization of unsaturated monomers in the presence of a chain transfer agent, e. g., carbon tetrachloride. This latter process has been called "telomerization." See U. S. 2,440,800.

This invention is applicable to the polymerization of any unsaturated compound subject to addition polymerization by prior techniques. Optimum conditions may vary from monomer to monomer, and since liquid phase polymerization is desired gases such as ethylene and propylene require pressure.

The polymerizations are usually carried out at −40° C. to 60° C. and preferably at −25° C. to +30° C. Temperatures may be lower; however, the rate of polymerization is generally low. Higher temperatures may be used particularly when the time of polymerization is to be kept at a minimum, e. g., in a continuous process. In general, the time required for substantial polymerization depends upon other variables, such as the specific temperature and concentrations of monomer, catalyst, etc. Times of from one to twenty-four hours are customarily employed although the polymerization may require only a few minutes.

The polymerization may be carried out by conventional means in aqueous systems in which the catalyst, monomer, and diluent are preferably uniformly dispersed, e. g., solution, emulsion, or granular systems.

The vanadous ion (V$^{++}$) is generally present in amounts of 0.001 to 5% based on the weight of polymerizable monomer. A suitable source of vanadous ion is by the reduction of a vanadyl salt prior to use such as with zinc in a Jones Reductor. In the system of this invention, the vanadous compound is the sole reducing agent present.

The mild oxidizing agent is usually present in amounts of 0.001 to 5% based on the weight of polymerizable monomer. Hydroxylamine salts and derivatives are likewise applicable as mild oxidizing agents. Included are hydroxylamine hydrochloride and sulfate; oximes of carboxyl compounds, e. g., formaldehyde, acetone, cyclohexanone, butyraldehyde; hydroxamide acids, e. g., those of adipic and sebacic acids, and benzenesulfohydroxamic acid. Also useful are the lower, i. e., one to four carbon, aliphatic nitro aliphatics and particularly the nitroalkanes of one to four carbons.

As illustrated by the examples, the process of this invention results in rapid polymerizations of polymerizable monomers at low temperatures.

Products obtained by the process of this invention and by the process of Howard U. S. Patent 2,567,109 are claimed in my copending application Serial No. 306,931, filed August 28, 1952.

The foregoing detailed description has been given for clearness of understanding only and no unnecessary limitations are to be understood therefrom. The invention is not limited to the exact details shown and described for obvious modifications will occur to those skilled in the art.

What is claimed is:

1. In the polymerization of ethylenically unsaturated monomers subject to addition polymerization by reason of a nonaromatic carbon-carbon double bond, the improvement wherein the monomer is polymerized by bringing the same in contact, in aqueous dispersion, with vanadous, V$^{++}$, ion as the sole reducing agent and a hydroxylamino compound.

2. In the polymerization of ethylenically unsaturated monomers subject to addition polymerization by reason of a nonaromatic carbon-carbon double bond, the improvement wherein the monomer is polymerized by bringing the same in contact, in aqueous dispersion, with vanadous, V$^{++}$, ion as the sole reducing agent and a hydroxylamine salt.

3. In the polymerization of ethylenically unsaturated monomers subject to addition polymerization by reason of a nonaromatic carbon-carbon double bond, the improvement wherein the monomer is polymerized by bringing the same in contact, in aqueous dispersion, with vanadous, V$^{++}$, ion as the sole reducing agent and an oxime.

4. In the polymerization of ethylenically unsaturated monomers subject to addition polymerization by reason of a nonaromatic carbon-carbon double bond, the improvement wherein the monomer is polymerized by bringing the same in contact, in aqueous dispersion, with vanadous, V$^{++}$, ion as the sole reducing agent and a hydroxamic acid.

5. In the polymerization of ethylenically unsaturated monomers subject to addition polymerization by reason of a nonaromatic carbon-carbon double bond, the improvement wherein the monomer is polymerized by bringing the same in contact, in aqueous dispersion, with vanadous, V$^{++}$, ion as the sole reducing agent and a hydroxylamino compound

wherein R and R' are monovalent hydrocarbon radicals.

6. In the polymerization of ethylenically unsaturated monomers subject to addition polymerization by reason of a nonaromatic carbon-carbon double bond, the improvement wherein the monomer is polymerized by bringing the same in contact, in aqueous dispersion, with vanadous, V$^{++}$, ion as the sole reducing agent and a hydroxylamino compound

wherein R and R' are hydrocarbon radicals forming together a divalent hydrocarbon radical.

7. In the polymerization of acrylonitrile, the improvement wherein an acrylonitrile composition is polymerized by bringing the same in contact, in aqueous dispersion, with vanadous, V$^{++}$, ion as the sole reducing agent, and a hydroxylamino compound.

8. In the polymerization of acrylonitrile, the improvement wherein an acrylonitrile composition is polymerized by bringing the same in contact, in aqueous dispersion, with vanadous, V$^{++}$, ion as the sole reducing agent, and a hydroxylamine salt.

9. In the polymerization of vinyl halides, the improvement wherein a vinyl halide composition is polymerized by bringing the same in contact, in aqueous dispersion, with vanadous, $V^{++}$, ion as the sole reducing agent, and a hydroxylamino compound.

10. In the polymerization of vinyl chloride, the improvement wherein a vinyl chloride composition is polymerized by bringing the same in contact, in aqueous dispersion, with vanadous, $V^{++}$, ion as the sole reducing agent, and a hydroxylamino compound.

11. In the polymerization of vinyl chloride, the improvement wherein a vinyl chloride composition is polymerized by bringing the same in contact, in aqueous dispersion, with vanadous, $V^{++}$, ion as the sole reducing agent, and a hydroxylamine salt.

References Cited in the file of this patent

UNITED STATES PATENTS

| Number | Name | Date |
|---|---|---|
| 2,416,461 | Stewart | Feb. 25, 1947 |
| 2,567,109 | Howard | Sept. 4, 1951 |

FOREIGN PATENTS

| Number | Country | Date |
|---|---|---|
| 599,472 | Great Britain | Mar. 12, 1948 |